United States Patent
Paulzagade et al.

(10) Patent No.: US 9,690,670 B1
(45) Date of Patent: Jun. 27, 2017

(54) SYSTEMS AND METHODS FOR DOING AGENTLESS BACKUP IN SCALE-OUT FASHION

(71) Applicant: Veritas Technologies LLC, Mountain View, CA (US)

(72) Inventors: Sudhakar W. Paulzagade, Pune (IN); Pradip M. Kulkarni, Pune (IN); Saurabh Jain, Madhya Pradesh (IN); Siddharth S. Karandikar, Maharashtra (IN)

(73) Assignee: Veritas Technologies LLC, Mountain View, CA (US)

( * ) Notice: Subject to any disclaimer, the term of this patent is extended or adjusted under 35 U.S.C. 154(b) by 243 days.

(21) Appl. No.: 14/319,977

(22) Filed: Jun. 30, 2014

(51) Int. Cl.
*G06F 17/30* (2006.01)
*G06F 11/14* (2006.01)

(52) U.S. Cl.
CPC .... *G06F 11/1464* (2013.01); *G06F 17/30017* (2013.01)

(58) Field of Classification Search
CPC ......... G06F 17/30008; G06F 17/30067; G06F 11/1456; G06F 11/1438; G06F 11/1464
USPC .................. 707/640, 644, 652, 651; 711/162
See application file for complete search history.

(56) References Cited

U.S. PATENT DOCUMENTS

| | | | |
|---|---|---|---|
| 6,026,414 A * | 2/2000 | Anglin | |
| 8,438,349 B2 * | 5/2013 | Olson et al. | 711/162 |
| 8,886,609 B2 * | 11/2014 | Buragohain et al. | 707/649 |
| 9,201,887 B1 * | 12/2015 | Earl et al. | |
| 2011/0047340 A1 * | 2/2011 | Olson et al. | 711/162 |
| 2012/0158662 A1 * | 6/2012 | Buragohain et al. | 707/649 |
| 2016/0110267 A1 * | 4/2016 | Earl et al. | 707/639 |

OTHER PUBLICATIONS

Clarke et al., Assessing the attack resilience capabilities of a fortified primary-backup system, 2010, IEEE, 182-187.*

* cited by examiner

*Primary Examiner* — Jean B Fleurantin
(74) *Attorney, Agent, or Firm* — Campbell Stephenson LLP

(57) ABSTRACT

Various systems, methods and apparatuses for intelligently and dynamically allocating proxy backup clients to back up and restore vast amounts of data distributed across a network are presented. One method involves identify distributed data stored in a computer system, requesting the data, and performing a backup or restore operation on the data. Other aspects include intelligently dynamically allocating proxy backup clients to perform backup and restore operations on data distributed across a network, and intelligently and dynamically balancing, or re-balancing or otherwise managing the workload among the proxy backup clients.

17 Claims, 10 Drawing Sheets

SYSTEMS AND METHODS FOR DOING AGENTLESS BACKUP IN SCALE-OUT FASHION

BACKGROUND OF THE INVENTION

Field of the Invention

This application relates to backup systems. More particularly, this application relates to the use of intelligently and dynamically allocated proxy backup clients to back up vast amounts of data distributed across a network.

Description of the Related Art

The amount of data created on the Internet and by business organizations, among other persons and entities, is incredibly vast and constantly growing. The rapidly-increasing amount of information available in electronic form places ever-increasing demands on systems for storing, processing, and protecting that information. While data growth is not new, the pace of data growth continues to increase, and the locations in which that data is stored have become increasingly dispersed. Moreover, the economic value associated with this data is significant, and is also rapidly increasing. The need to store and process this data in an efficient manner must necessarily be balanced with the need to adequately and efficiently protect this data and the economic value associated with the data.

Due at least in part to this explosion of data, the systems used to store and process this data have been increasingly distributed, and increasingly specialized. As a result of this specialization, many systems employ a distributed network of computer systems that are primarily focused on storing portions of the data. In turn, those systems designate one or more computer systems as a centralized management resource responsible for coordinating the storage and retrieval of the data stored on the distributed computer systems. While this architecture has many benefits, this type of system also creates a significant bottleneck during the backup and restore processes due to the one-to-many configuration of the network.

SUMMARY OF THE INVENTION

Various systems, methods and apparatuses for intelligently and dynamically allocating proxy backup clients to back up and restore vast amounts of data distributed across a network are presented. For example, in one embodiment, one or more computer(s) can be used to backup and/or restore data by identifying data that is stored in one or more computer system(s) (e.g., data nodes), where each computer system includes a plurality of computers that are being used to store the data (e.g., data nodes) and the computer used to back up and/or restore the data identifies the computer system(s) that are storing and/or requesting the data. The computer can use a proxy backup client to request and/or send the data from the computer(s) being used to store and/or request the data, and perform a backup and/or restore operation on that data. In one embodiment, such backup and/or restore operations can be performed by two or more different computers processing data at substantially the same time, e.g., in parallel. In one embodiment, a computer being used to backup and/or restore data may also request and/or send information from/to other computers about the location of the data and/or about the location of the computer(s) requesting and/or sending the data.

In one embodiment, one or more computer(s) can be used to invoke a plurality of proxy backup clients to perform the backup and/or restore operations. These proxy backup clients may be selected based on various criteria, including, e.g., the available bandwidth of the potential proxy backup client, the available processing power of the proxy backup client, and/or the geographic proximity to the computer(s) on which the data is being stored.

In one embodiment, one or more computer(s) can be used to be determine how many proxy backup clients should be invoked. Such a determination can be based on various factors, including, e.g., the amount of data that needs to be backed up and/or restored, the amount of time allocated to perform the backup and/or restoration, the number of computers on which those data blocks are collectively stored and/or requested, the available bandwidth and other computing resources of the computers on which those data blocks are stored and/or requested, and the geographic distance the data will need to travel to be transmitted to/from the computer in which the data is stored/requested to and/or from the proxy backup clients.

In one embodiment, the workload can be dynamically re-allocated among one or more proxy backup clients as, e.g., the value(s) associated with the criteria change (e.g., due to an increase or decrease in bandwidth), new backup and/or restore requests are added, or previously-requested backup and/or restore requests are deleted from a queue or are completed sooner than originally anticipated (e.g., due to an increase in available bandwidth, perhaps resulting from the termination of an unrelated process or operation on one of the machines). Such dynamic reallocation can also occur, e.g., if one or more of the proxy backup clients crashes. Such dynamic reallocation can also occur, e.g., if one or more additional proxy backup clients becomes available. In the event that one or more additional proxy backup clients becomes available, the additional proxy backup client(s) may be added to the backup process in order to lessen the workload of another proxy backup client(s). Moreover, the additional proxy backup client(s) can replace another proxy backup client(s), either entirely or with respect to a portion of the workload, where the additional proxy backup client(s) are better suited to handling that portion of the workload (based on criteria such as, for example, network bandwidth, available processing power or memory, geographic location, or any other criteria or other considerations that are disclosed herein).

In one embodiment, one or more proxy backup client(s) may be added, removed, or reassigned after the backup and/or restore operation has begun. Such actions can occur, e.g., due to a change in the value(s) associated with the criteria change, new backup and/or restore requests are added, or previously-requested backup and/or restore requests are deleted, completed, or otherwise become unnecessary. In the event that one or more proxy backup client(s) are added or removed, the workload may be re-balanced or otherwise re-distributed among the new set of proxy backup clients.

In one embodiment, the proxy backup client(s) may communicate with each other either directly, through a centralized management resource, or through some other monitor (e.g., a program, application, algorithm, code, computer, or other computerized resource). Such communication may include, for example, communication about changes in the criteria discussed herein (e.g., available bandwidth, available processing power, memory, etc.), communication about the general availability of any/each of the proxy backup client(s) (e.g., information about a proxy backup client coming online or otherwise becoming available, information about a change (e.g., increase or decrease) in the available resources of a proxy backup client(s) and/or data node, information about a proxy backup client or data node going offline or otherwise becoming unavailable, information about a proxy backup client falling below a minimum required level of available resources, and/or information about a change in the status or availability of the network connectivity that affects a proxy backup client, a data node, or other network resource.

In one embodiment, one or more computer(s) can be used to perform other operations on the data that is to be backed up and/or restored. Such other operations can include, for example, de-duplicating, encrypting the data, and decrypting the data.

In one embodiment, the computer system(s) can perform any of the backup operations, restore operations, or other operations described in this disclosure between two or more computers that are using different operating systems. In this embodiment, as well as all other embodiments, the operations may be performed at substantially the same time (e.g., in parallel), even where the computers performing the operations are using different operating systems.

The foregoing is a summary and thus contains, by necessity, simplifications, generalizations and omissions of detail, consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The embodiments of the present application may be better understood, and its numerous objects, features, and advantages made apparent to those skilled in the art by referencing the accompanying drawings.

Figure 1:
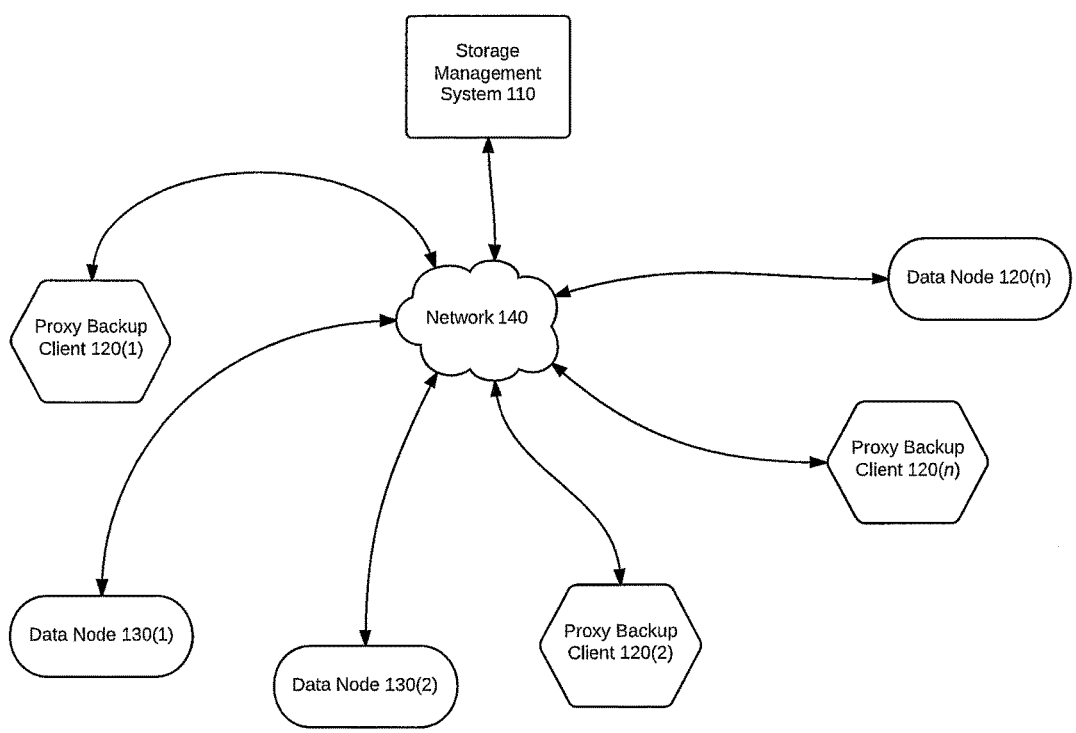
FIG. 1 is a block diagram illustrating a network comprising a storage management system, a plurality of data nodes, and a plurality of proxy backup clients, according to one embodiment of the present invention.

While the embodiments of the application are susceptible to various modifications and alternative forms, specific embodiments are provided as examples in the drawings and detailed description. It should be understood that the drawings and detailed description are not intended to limit the embodiments to the particular form disclosed. Instead, the intention is to cover all modifications, equivalents and alternatives falling within the spirit and scope of the invention as defined by the appended claims.

DETAILED DESCRIPTION

The present disclosure describes methods, computer program products, computer systems, and the like that provide for the performance of agentless backup and restore operations on a network containing distributed data. In such a system, an agentless backup is performed by dynamically invoking a plurality of proxy backup clients to backup and restore the distributed data. The proxy backup clients query the master computer system to determine the location of the data on the network, and coordinate with the relevant slave computer systems to backup and restore the data. The targeted backup operation comprises performing a backup operation on the in-use data block.

Embodiments of the present application are directed to efficiently backing up and restoring distributed data stored on a network of computers. For example, one such method identifies data stored in a plurality of computer systems comprising a plurality of data nodes, with the data being stored at one or more of the plurality of data nodes (or otherwise distributed across the computer system). Identifying the data involves identifying the data node(s) in which the requested data is stored. The method further involves using a computer (e.g., a proxy backup client) to request the data, and using a computer (e.g., a proxy backup client) to perform a backup operation on the data.

In order to protect the economic value associated with data, the need exists to protect that data in various ways, including the need to efficiently backup and restore that data across distributed networks. When data is stored in a distributed network, with a small number of computer systems in comparison to a vast number of data nodes that store the data, the need exists to be able to backup and restore the data without creating a bottleneck due to the small number of managing resources in the distributed network. Moreover, due to the often large amount of data that needs to be backed up on a regular (e.g., daily) basis, the need exists to backup and restore the data in an efficient manner, so that these operations can be completed in limited time frames.

As will be described more fully below, the invention disclosed herein solves these problems, among others, by providing methods, systems and apparatuses for dynamically allocating processing modules (implemented in software and/or hardware, such as, e.g., by one or more proxy backup clients) to alleviate the burden (and ensuing bottleneck) that would otherwise be placed on the centralized management resources. In certain embodiments of this invention, these proxy backup clients can be used to perform backup and/or restore operations on the data distributed across the network. Embodiments of the invention can also increase the efficiency of these backup and restore processes in various ways, such as by making use of various criteria to achieve workload balancing among the proxy backup clients. For instance, proxy backup clients with a substantial amount of available bandwidth and processing resources may be able to backup more data than a computer with less available bandwidth and processing resources could backup in the same amount of time. As another example, a proxy backup client that is located geographically closer to a data node may be able to complete the backup or restoration of a large amount of data in a shorter time frame than a proxy backup client that is located further away. As will be discussed in greater detail below, other factors may also be considered when allocating the proxy backup clients, thereby providing numerous benefits of vital importance to systems that store large amounts of distributed data.

FIG. 1 shows a system 100 that includes a storage management system 110, a plurality of proxy backup clients 120(1)-120(n), and a plurality of data nodes 130(1)-130(n), connected to one another through a network 140. Storage management system 110, each of the proxy backup clients 120(1)-120(n), and each of the data nodes 130(1)-130(n) can be implemented using any type of computer, such as, e.g., a personal computer, a workstation, a server device (e.g., a media server), and/or other devices having one or more processors and a memory. The storage management system, each of the proxy backup clients, and each of the data nodes can run any appropriate operating system, including, for example, WINDOWS, MAC OS, GNU/LINUX, UNIX, or any other operating system.

Storage management system 110 stores metadata and other information pertaining to, for example, the data stored in data nodes 130(1)-130(n), data nodes 130(1)-130(n) themselves, and/or network 140. Storage management system 110 can be used to manage the data stored in a distributed manner across network 140. Storage management system 110 can, for example, be operated in a data storage and retrieval system with data nodes 130(1)-130(n), where storage management system 110 is a centralized management resource (e.g., a NameNode) and one or more data nodes 130(1)-130(n) is/are distributed computer systems for, among other things, storing data (e.g., a DataNode).

Proxy backup clients 120(1)-120(n) support functionality that provides for backing up and restoring data distributed across a distributed data storage system, such as system 100 or system 200. Proxy backup clients 120(1)-120(n) can be deployed on any type of computer. In certain embodiments, proxy backup clients 120(1)-120(n) can be deployed on computers with significant processing power, bandwidth, available storage, and other resources, e.g., a media server. Proxy backup clients 120(1)-120(n) can be deployed in connection with any appropriate operating system, such as the operating systems listed elsewhere in this specification. Each of the computers upon which a proxy backup client is deployed can run a different operating system from one or more of the other computers hosting proxy backup clients 120(1)-120(n). Proxy backup clients 120(1)-120(n) can be deployed via a network (e.g., network 140), and interface with other nodes (e.g., storage management system 110, data nodes 130(1)-130(n), and other nodes discussed in this specification, such as a backup management system 210) via network 140 or another connection.

The data stored in the data nodes 130(1)-130(n) can include any type of information capable of being stored in a non-transient computer memory. The data may be grouped into various logical data units, including, but not limited to, files, database records, directories, webpages, system data (e.g., registries, directory structures, etc.), etc. The data stored in data nodes 130(1)-130(n) can include two or more different types of logical data units.

The data is stored in data nodes 130(1)-130(n) as one or more data blocks. The data blocks comprising a single unit of storage (e.g., a file) can be stored on a single data node among a group of data nodes of data nodes 130(1)-130(n). The data blocks comprising a single logical unit can also be stored on different data nodes among the group of data nodes. Any given data block can be associated with a single unit of storage, or with multiple units of storage. Each data block can be stored exactly one time, or can be stored as multiple instances, such that multiple copies of a particular data block can be stored in more than one of data nodes 130(1)-130(n).

The metadata and other information stored in storage management system 110 can include, for example, information about file system(s), the data, the set of data blocks that comprise a given logical data unit (e.g., the data blocks that comprise a single file), and the location of each of those data blocks (e.g., at which of data node(s) 120(1)-120(n) and where in the storage thereof). This metadata and other information can also include, for example, information about data nodes in which each of those data blocks is stored, including, for example, information about the location, resources (e.g., memory, processing speed), available bandwidth, internet connection speed, and any other attribute that can be associated with a computer system such as a data node. The metadata and other information can also include, for example, information about the network, including, for example, available bandwidth, transfer speed of the network, and the availability of any given path across the network.

Network 140 can be any type of network, including, but not limited to, the Internet, an intranet, a subnet, a Local Area Network (LAN), a Wide Area Network (WAN), and a Storage Area Network (SAN), and may be wired (e.g., Ethernet) or wireless (e.g., Wi-Fi). The network 140 can also include one or more network devices, such as routers, switches, and the like, used to facilitate transmission of data between the various computing devices.

Figure 2:
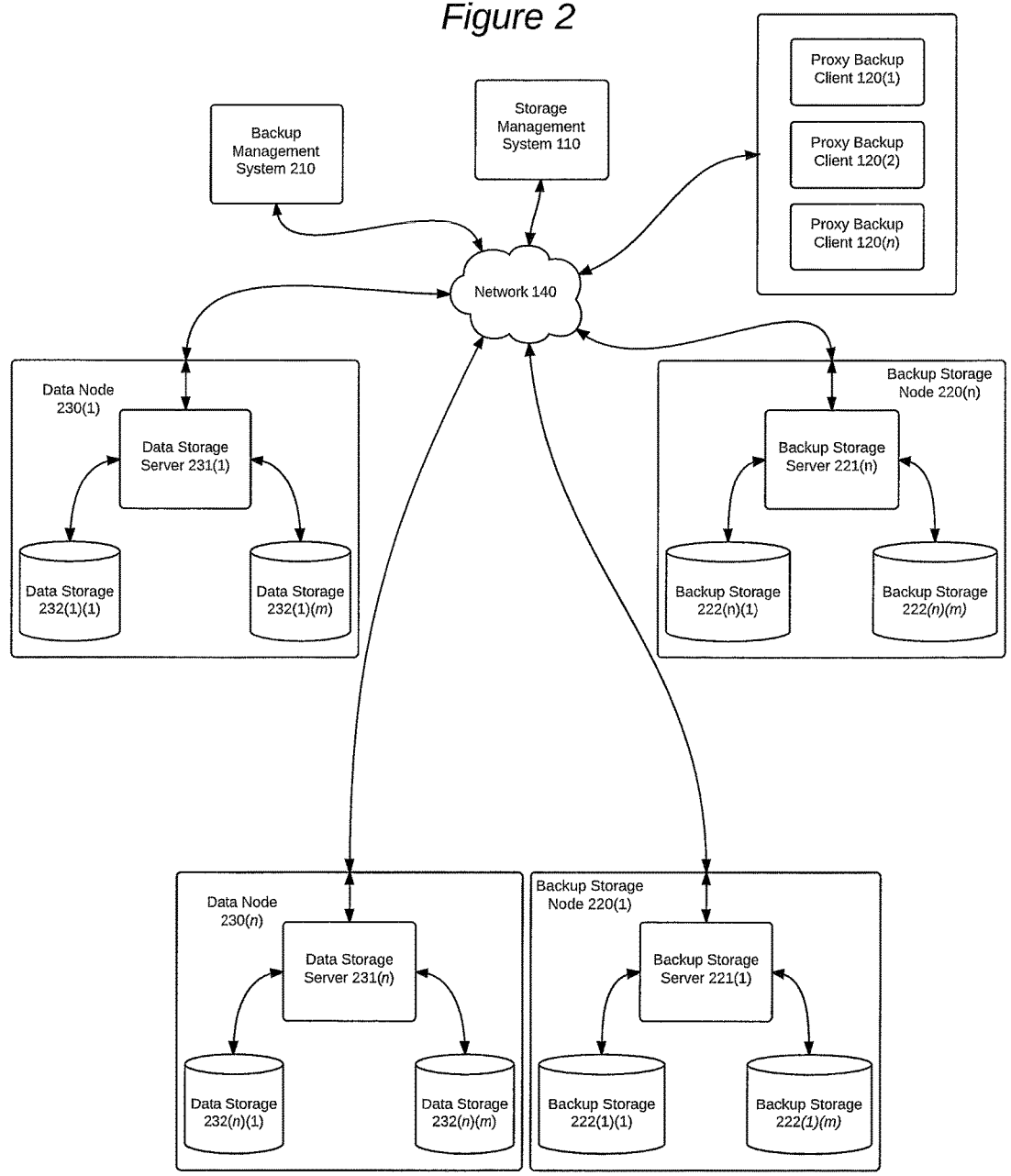
FIG. 2 is a block diagram illustrating a network comprising a storage management system, a backup management system, a plurality of data nodes comprising data storage, a plurality of backup servers comprising storage, and a plurality of proxy backup clients, according to one embodiment of the present invention.

FIG. 2 shows a system 200 that includes storage management system 110, a plurality of proxy backup clients 120(1)-120(n), a backup management system 210, a plurality of backup servers 220(1)-220(n), and a plurality of data nodes 230(1)-230(n), which are communicatively coupled to one another via network 140.

Backup management system 210 includes, but is not limited to, software that can be used to control the backup and restore processes described herein. The software used to control these processes can be deployed on any type of computer. Backup management system 210 can be deployed in connection with any appropriate operating system, such as the operating systems listed elsewhere in this specification. A system, such as system 100 or system 200, can contain more than one backup management system (such as, e.g., backup management system 210), and those backup management systems can be deployed in connection with different operating systems. The backup management system(s) can be connected to a system via a network (e.g., network 140) and interface with other nodes (e.g., storage management system 110, data nodes 130(1)-130(n), and other nodes discussed in this specification, such as a backup storage nodes 220(1)-220(n)) via network 140 or another such communication mechanism.

Backup storage nodes 220(1)-220(n) can include a computer (e.g., a backup storage server) 221(1)-221(n) and backup storage 222(1)(1)-222(n)(m). Computers 221(1)-221(n) can be any type of computer, including servers, as depicted in FIG. 2. Backup storage servers 221(1)-221(n)

can include software that can be used to store and serve data in connection with the backup and restore processes described herein. Backup storage servers 221(1)-221(n) can use any appropriate operating system, such as the operating systems listed elsewhere in this specification. Any given backup storage server of the backup storage servers 221(1)-221(n) can use a different operating system(s) from the other backup storage servers 221(1)-221(n). The backup storage servers 221(1)-221(n) can be connected to a system via a network (e.g., network 140) and interface with other nodes (e.g., storage management system 110, data nodes 130(1)-130(n), and other nodes discussed in this specification, such as backup management system 210) via network 140 or another connection.

Each of the backup storage servers 221(1)-221(n) can include one or more units of backup storage 222(1)(1)-222(n)(m). As depicted in FIG. 2, for example, backup storage server 221(1) can include backup storage 222(1)(1)-222(1)(m), backup storage server 221(2) can include backup storage 221(2)(1)-222(2)(m), and so on through backup storage server 221(n), which can include backup storage 221(n)(1)-221(n)(m). The backup storage may be any non-volatile memory. The backup storage can be included in the same physical machine on which the backup server is implemented. Alternatively, or in combination, all or part of the backup storage can also be a discrete physical entity that is communicatively coupled to its associated backup storage server via, e.g., a network, a direct connection (e.g., Ethernet, USB, FIREWIRE, THUNDERBOLT), or any other type of connection that can be used to transfer data between two computing devices.

Moreover, as used throughout this specification, the letters n and m can be any positive integer, as that term is commonly defined in the field of mathematics. Moreover, the value of these integers can vary from one implementation to the next, and among nodes within a given implementation. Thus, in connection with FIG. 2, a system may include, for example, n=300 data storage servers, n=200 backup storage servers, and n=50 proxy backup clients. Moreover, one backup storage server may include, for example, m=1 units of backup storage, another backup storage server may include m=5 units of backup storage, and a data storage server may include m=8 units of backup storage. These numbers are only examples intended to illustrate the principles discussed in this paragraph, and are not intended to have any weight or limitation beyond that purpose.

Data nodes 230(1)-230(n) can include a computer (e.g., a data storage server) 231(1)-231(n), and one or more units of data storage 232(1)(1)-232(n)(m). In this embodiment, data storage 232(1)(1)-232(1)(m) is coupled to data storage server 231(1), data storage 232(2)(1)-232(2)(m) is coupled to data storage server 231(2), and so on. Data storage servers 231(1)-231(n) are connected to the network 140. Data storage servers 231(1)-231(n) can run any appropriate operating system, including, for example, WINDOWS, MAC OS, GNU/LINUX, UNIX, or any other operating system. Each data storage server 231(1)-231(n) does not necessarily have to run the same operating system as any other data storage server 231(1)-231(n). This architecture provides many advantages, including the ability to easily scale the system by adding or removing data nodes 230(1)-230(n), by adding, removing or changing data storage server(s) 231(1)-231(n) within a data node, and by adding, removing or changing the data storage 232(1)-232(n) within a data node.

Backup storage servers 221(1)-221(n) and backup management system 210 can be implemented using any type of computer appropriate to such applications, such as a personal computer, a workstation, a server device (e.g., a storage server or a media server), and/or other devices having one or more processors and a memory. Backup storage servers 221(1)-221(n) and backup management system 210 can run any appropriate operating system, including, for example, WINDOWS, MAC OS, GNU/LINUX, UNIX, or any other operating system.

Figure 3:
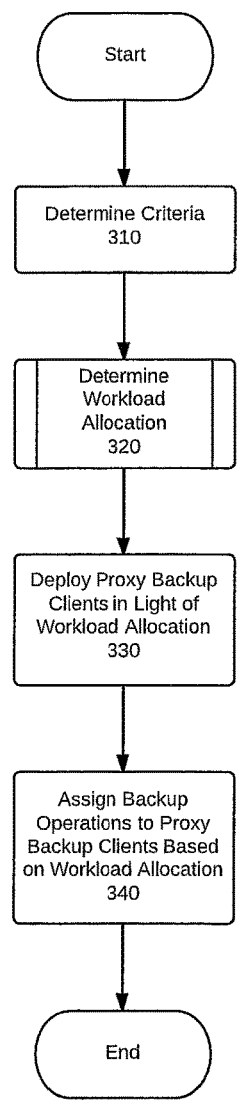
FIG. 3 is a flowchart for invoking proxy backup clients, according to one embodiment of the present invention.

FIG. 3 is a flowchart of a method 300 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 300 is described with reference to elements such as those described in connection with FIGS. 1 and 2. In one implementation, at least a portion of method 300 can be implemented and/or performed by a backup management system, such as backup management system 210. However, a backup management system is not required to perform any of the steps of method 300.

In element 310, the backup management system determines criteria that can be used in other aspects of this invention. For instance, the backup management system can determine various criteria about the data nodes (e.g., data nodes 130(1)-130(n) and data nodes 230(1)-230(n)), the computers that are potential hosts for backup proxy clients 120(1)-120(n), the network 140, the data, and the data blocks. These criteria can include, for example, the available bandwidth of a computer, the total processing power and the available processing power of a computer, the total memory and the available memory of a computer, the number of network interfaces and the bandwidth available for each network interface, the operating system(s) available on a computer, the geographic location of a computer, and other relevant criteria associated with the computer. These criteria can also include, for example, the total amount of data, the total amount of data to be backed up and/or restored, the location of the data blocks that comprise that data, the distribution of the data blocks among the data nodes, and other criteria related to the location, allocation and distribution of the data and data blocks.

In element 320, the backup management system can use the criteria to determine the workload allocation among proxy backup clients 120(1)-120(n). As will be apparent in reference to FIG. 4, discussed below, the criteria may be used to determine the workload allocation in a manner that balances that workload among proxy backup clients 120(1)-120(n) in various ways. Moreover, such workload may be allocated in a manner that allows one or more of proxy backup clients 120(1)-120(n) to perform the backup, restore, or other operations at substantially the same time as one or more other proxy backup clients 120(1)-120(n).

In element 330, the backup management system can deploy the proxy backup clients 120(1)-120(n) in light of the criteria, workload allocation, and/or by other means. The process of deploying the proxy backup clients 120(1)-120(n) can include downloading software to the host computers, loading software on the host computers from local media, instantiating software that is already on the proxy backup clients 120(1)-120(n), or by any other means available for deploying software on a computer. The process of deploying the proxy backup clients 120(1)-120(n) may also vary among the proxy backup clients 120(1)-120(n) that are being deployed.

The proxy backup clients 120(1)-120(n) can be deployed in light of their assigned workload. In one aspect of this invention, the number of proxy backup clients 120(1)-120(n) to be deployed can be determined with respect to the total volume of data to be processed. In one aspect of this invention, the location of the proxy backup clients 120(1)-120(n) can be determined with respect to the location of the data to be processed.

In element 340, the backup management system can assign backup operations to the proxy backup clients 120(1)-120(n). This assignment can be based on the criteria, or the workload allocation determined in step 320, and/or other factors. The assignment of backup operations comprises assigning one or more specific proxy clients from among the plurality of proxy clients 120(1)-120(n) to backup specific data or data blocks stored in the data nodes.

Figure 4:
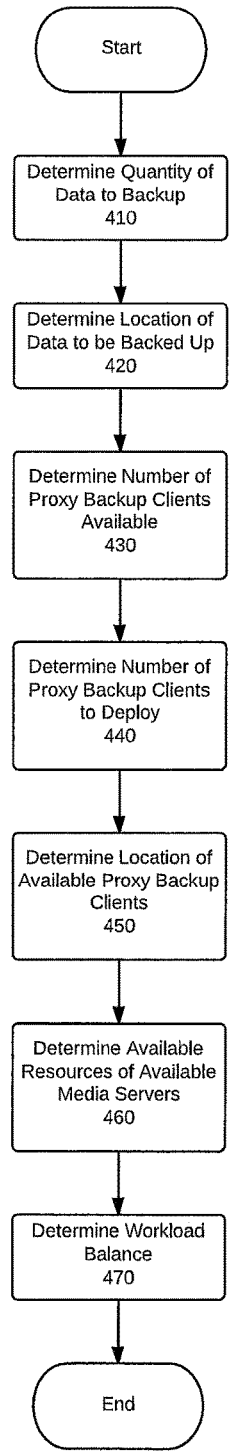
FIG. 4 is a flowchart for determining workload allocation among a plurality of proxy backup clients, according to one embodiment of the present invention.

FIG. 4 is a flowchart of a method 400 illustrating various actions performed in connection with one embodiment the invention disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 400 is described with reference to elements such as those described in connection with FIGS. 1 and 2. In one implementation, at least a portion of method 400 can be implemented and/or performed by a backup management system, such as backup management system 210. However, a backup management system is not required to perform any of the steps of method 400.

More particularly, FIG. 4 illustrates a method 400 for determining the workload allocation (or re-allocation), as can be used in conjunction with element 320 of FIG. 3. In one embodiment, method 400 begins with element 410, wherein a backup management system determines the quantity of data to be backed up. This determination may be made by consulting a backup schedule, or by receiving instructions from some other source, such as a computer inside or outside of systems 100 and 200 depicted in FIGS. 1 and 2, respectively. In element 420, the location of the data to be backed up is determined. This step can include determining the data node(s) that host each of the data blocks to be backed up.

Element 430 determines the number of proxy backup clients available to be used during the backup option. This determination may be made, at least in part, based on the number of computers with sufficient resources (such as a media server, for example) that are connected to the network 140 and have sufficient availability in light of other factors, such as other processes currently being performed on that computer. Element 440 determines the number of proxy backup clients that should be deployed. This determination may be made, at least in part, upon the amount and location of the data to be processed.

Element 450 determines the location of the available proxy backup clients, where the location can include, e.g., the geographical location and/or the IP address of each proxy backup client. Element 460 determines the available resources of the servers that are potentially available to host a proxy backup client. Such resources can include the same criteria discussed elsewhere in this application. Those resources can be determined based on criteria which were previously determined and stored, and can also be determined dynamically during this step of the process.

The method 400 balances (or re-balances) the workload in element 470. Balancing (or re-balancing) the workload can involve consideration of the determinations made in elements 410, 420, 430, 440, 450 and 460, amongst other factors. The goals of balancing the workload can include, for example, allocating the data selected for backup to proxy backup clients 120(1)-120(n) in a manner that results in each of the proxy backup clients being assigned approximately the same quantity of data. Balancing the workload can also include, for example, allocating the data selected for backup to proxy backup clients 120(1)-120(n) in a manner that results in each proxy backup client completing its portion of the backup in approximately the same amount of time, or at approximately the same time. Further, certain of proxy backup clients 120(1)-120(n) can be grouped to process large structures (e.g., large files or databases), either by spreading the requisite ones of proxy backup clients 120(1)-120(n) across multiple computer systems, or on a single computer system.

For instance, a proxy backup client that is physically located closer to its assigned data may (depending on other factors, such as available bandwidth and network speed) by able to process a greater amount of data than a proxy backup client located further away from its assigned data may be able to process in the same amount of time. Similarly, as a further example, a proxy backup client that has more available resources (e.g., processing speed, and available processing capacity based on other current workloads) may be able to process a greater amount of data than a "slower" or "less available" proxy backup client may be able to process in the same amount of time. As yet another example, a proxy backup client that is coupled to a data node via a faster connection, or via a connection with more available bandwidth, may be able to process a greater amount of data than a proxy backup client connected via a slower or "less available" connection may be able to process in the same amount of time. As another example, the workload balance may be based, in whole or in part, on the amount of storage available in connection with each proxy backup client 120(1)-120(n). As a further example, workload balancing may be based on criteria such as the time needed to de-duplicate and/or encrypt the data blocks, or in view of an expected need to restore certain data blocks more often than others.

One embodiment of this invention can combine these considerations, along with other relevant considerations, into an algorithm that determines how much data and/or which specific data blocks should be assigned to which specific proxy backup clients in order to achieve the desired goal (e.g., equal distribution of data, equal time needed for each proxy backup client 120(1)-120(n) to complete its portion of the backup, achieving backup times as close to equal as possible in light of the available storage available in connection with each proxy backup client 120(1)-120(n), etc.). Such an algorithm may be performed with any computer, such as, for example, backup management system 110.

One embodiment of this invention can determine how many proxy backup clients should be invoked. Such a determination can be based on the various criteria discussed herein, including, e.g., the amount of data that needs to be backed up and/or restored, the amount of time allocated to perform the backup and/or restoration, the number of computers on which those data blocks are collectively stored and/or requested, the available bandwidth and other computing resources of the computers on which those data blocks are stored and/or requested, and the geographic distance the data will need to travel to be transmitted to/from the computer in which the data is stored/requested to and/or from the proxy backup clients.

One embodiment of method 400 can be used to dynamically re-balance the workload, re-allocate all or part of the workload between one or more of proxy backup clients 120(1)-120(n), and/or add or remove proxy backup clients to the group of proxy backup clients assigned all or part of the workload. For example, the workload can be dynamically re-allocated among one or more proxy backup clients as, e.g., the value(s) associated with the criteria change (e.g., due to an increase or decrease in bandwidth), new backup and/or restore requests are added, or previously-requested backup and/or restore requests are deleted from a queue or are completed sooner than originally anticipated (e.g., due to an increase in available bandwidth, perhaps resulting from the termination of an unrelated process or operation on one of the machines). Such dynamic reallocation can also occur, e.g., if one or more of the proxy backup clients crashes. Such dynamic reallocation can also occur, e.g., if one or more additional proxy backup clients becomes available. In the event that one or more additional proxy backup clients becomes available, the additional proxy backup client(s) may be added to the backup process in order to lessen the workload of another proxy backup client(s). Moreover, the additional proxy backup client(s) can replace another proxy backup client(s), either entirely or with respect to a portion of the workload, where the additional proxy backup client(s) are better suited to handling that portion of the workload (based on criteria such as, for example, network bandwidth, available processing power or memory, geographic location, or any other criteria or other considerations that are disclosed herein).

As a further example, one or more proxy backup client(s) may be added, removed, or reassigned after the backup and/or restore operation has begun. Such actions can occur, e.g., due to a change in the value(s) associated with the criteria change, new backup and/or restore requests are added, or previously-requested backup and/or restore requests are deleted, completed, or otherwise become unnecessary. In the event that one or more proxy backup client(s) are added or removed, the workload may be re-balanced or otherwise re-distributed among the new set of proxy backup clients.

At least in part to facilitate such functionality (as well as the functionality described elsewhere in this disclosure), the proxy backup client(s) may communicate with each other either directly, through a centralized management resource, or through some other monitor (e.g., a program, application, algorithm, code, computer, or other computerized resource). Such communication may include, for example, communication about changes in the criteria discussed herein (e.g., available bandwidth, available processing power, memory, etc.), communication about the general availability of any/each of the proxy backup client(s) (e.g., information about a proxy backup client coming online or otherwise becoming available, information about a change (e.g., increase or decrease) in the available resources of a proxy backup client(s) and/or data node, information about a proxy backup client or data node going offline or otherwise becoming unavailable, information about a proxy backup client falling below a minimum required level of available resources, and/or information about a change in the status or availability of the network connectivity that affects a proxy backup client, a data node, or other network resource. Such communication can also include requesting and/or sending information from/to proxy backup clients or other computers about the location of the data and/or about the location of the computer(s) requesting and/or sending the data. Any such information communicated can be used to add or remove proxy backup clients, and/or to re-allocate (or otherwise change or modify, e.g., by adding or removing data to be backed up or restored, or by adding or removing operations to be performed on data during the backup and/or restore operations) the workload among proxy backup clients.

Figure 5:
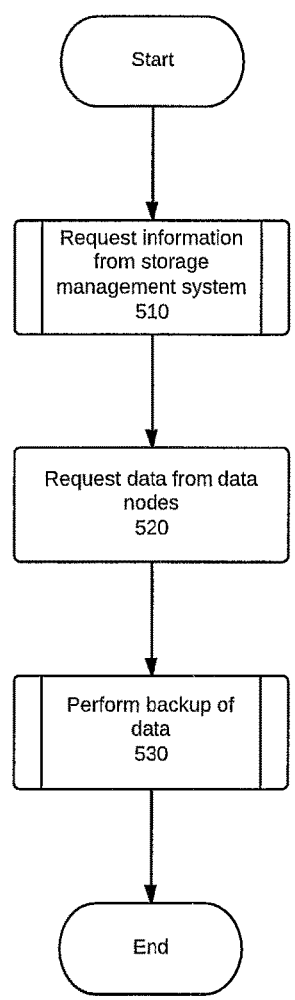
FIG. 5 is a flowchart for a backup process of data distributed across a network, according to one embodiment of the present invention.

FIG. 5 is a flowchart of a method 500 illustrating various actions performed in connection with one embodiment the invention disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 500 is described with reference to elements such as those described in connection with FIGS. 1 and 2. In one implementation, at least a portion of method 500 can be implemented and/or performed by one or more proxy backup clients, such as one or more of the proxy backup clients 120(1)-120(n). However, a proxy backup client is not required to perform any of the steps of method 500.

At a high level, method 500 illustrates the process performed by proxy backup clients in order to backup data. In element 510, the proxy backup client can request information from a storage management system, such as storage management system 110. More detail about this information is provided in FIG. 6 and the accompanying discussion, but for purposes of the instant discussion this information can briefly be described as information identifying the data node upon which the requested data blocks are stored. In element 520, the proxy backup client can request the requested data blocks from the data node upon which those data blocks are stored. As will be explained in more detail in FIG. 7 and the accompanying discussion, during the operations represented by element 530 the proxy backup client may back up the data (or cause the data to be backed up), and then store that data (or cause that data to be stored) in a non-transient memory.

Figure 6:
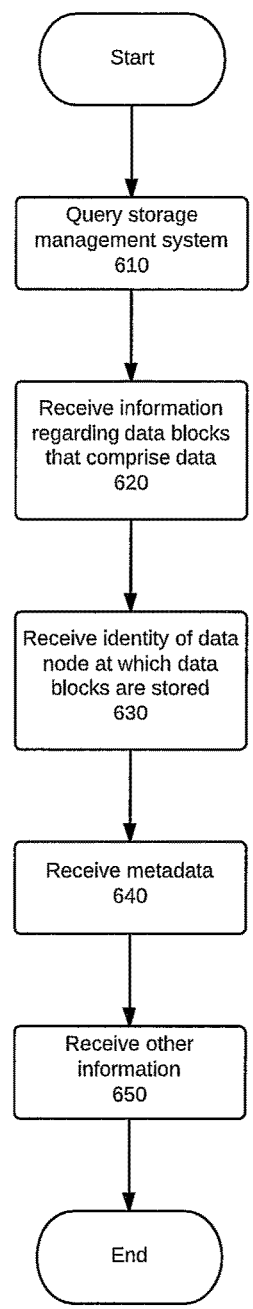
FIG. 6 is a flowchart for requesting information from a storage management system, according to one embodiment of the present invention.

FIG. 6 is a flowchart of a method 600 illustrating various actions performed in connection with one embodiment the invention disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 600 is described with reference to elements such as those described in connection with FIGS. 1 and 2. In one implementation, at least a portion of method 600 can be implemented and/or performed by one or more proxy backup clients, such as one or more of proxy backup clients 120(1)-120(n). However, a proxy backup client is not required to perform any of the steps of method 600.

FIG. 6 generally illustrates the process 510 followed to request information from a storage management system, such as storage management system 110. In element 610, a proxy backup client can query a computer (e.g., storage management system 210) to provide information about data that is to be backed up. This information may include, for example, information about the set of data blocks that comprise a logical data unit. This information may also include, for example, information about the data nodes upon which each of those data blocks is stored, including information about the identity of those data nodes. This information may also include, for example, metadata and/or other information about the data, data blocks, and/or data nodes. In elements 620, 630, 640 and 650, the proxy backup client that submitted the query receives this information from a computer (e.g., storage management system 110). Moreover, with respect to each of the steps of method 600, as well as with respect to other methods disclosed herein, one or more of proxy backup clients 120(1)-120(n) may operate at substantially the same time (e.g., in parallel) as/with another one or more of proxy backup clients 120(1)-120(n).

At element 620, the proxy backup client(s) that submitted this query receive(s) information about the data blocks that comprises the data. For instance, this information may pertain to various criteria pertaining to the data blocks, such as, e.g., the size, quantity, format, or duplicity of the data blocks. This information may also include, e.g., the file(s) in which each of these data blocks are used. At element 630, the proxy backup client(s) that submitted this query receive(s) the identity of the computer systems at which the data blocks are stored. This identity could be provided in any manner that adequately identifies the computer systems, such as, e.g., an IP address, MAC address, URL, network path, file path, or any other identifying information. At element 640, the proxy backup client(s) that submitted this query receive metadata and at element 650 those proxy backup client(s) receive other information. The metadata and other information received can include, e.g., the types of metadata and other information described elsewhere in this specification, including, for example, in conjunction with the discussion pertaining to FIG. 1, above.

Figure 7:
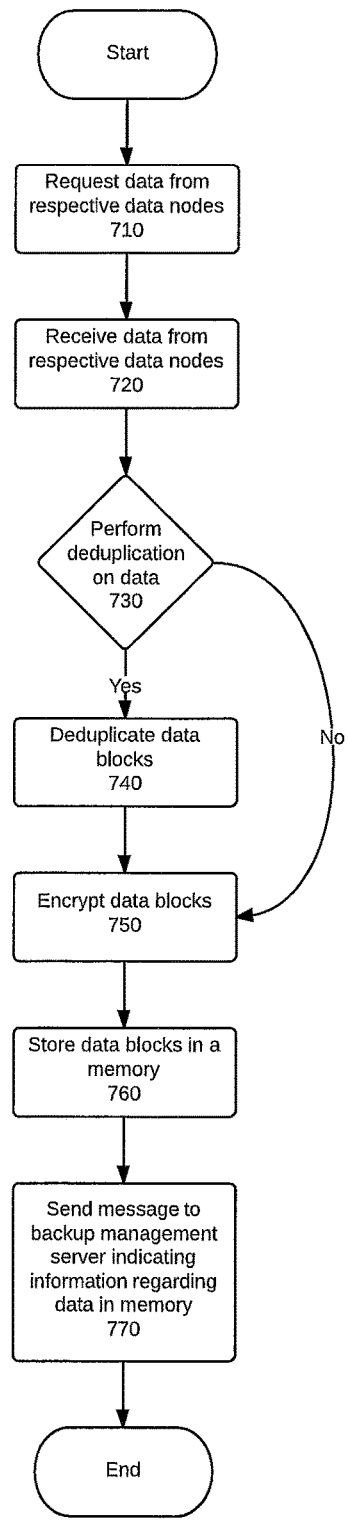
FIG. 7 is a flowchart for performing a backup of data distributed across a network, according to one embodiment of the present invention.

FIG. 7 is a flowchart of a method 700 illustrating various actions performed in connection with one embodiment the invention disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 700 is described with reference to elements such as those described in connection with FIGS. 1 and 2. In one implementation, at least a portion of method 700 can be implemented and/or performed by one or more proxy backup clients, such as one or more of the proxy backup clients 120(1)-120(n). However, a proxy backup client is not required to perform any of the steps of method 700.

Method 700 generally describes the process used to perform the backup of data 530. This method 700 can be performed, for example, by one or more proxy backup clients 120(1)-120(n). For ease of discussion, method 700 will be discussed with respect to a single proxy backup client, but in practice can be performed by multiple of the proxy backup clients 120(1)-120(n) substantially simultaneously. As is the case with other methods or steps disclosed herein, one or more of proxy backup clients 120(1)-120(n) may complete one or more steps of method 700 at substantially the same time (e.g., in parallel) as/with another one or more of proxy backup clients 120(1)-120(n).

In element 710, a proxy backup client requests data from one or more data nodes. This request can be based on the information received from a storage management system, as depicted and described in conjunction with element 510. A single proxy backup client can request data from more than one data node at substantially the same time, or at separate times. In element 720, the proxy backup client receives the data from the one or more data node(s).

Once the requested data has been received, the proxy backup client can determine whether deduplication of the data is necessary in element 730. If deduplication is necessary, the data blocks can be de-duplicated in element 740. With respect to both element 730 and element 740, the deduplication may be considered and performed from various perspectives. In one embodiment, the deduplication may be performed with respect to multiple instances of the same data block being stored on a single data node. In one embodiment, the deduplication may be performed with respect to multiple instances of a single data block that are stored on different data nodes within the system, e.g., system 100 or system 200. In one embodiment, the deduplication may be performed because substantially identical data blocks are included in distinct logical data units (e.g., distinct files), wherein a single copy of the data block can be shared by both logical data units. In one embodiment, the deduplication may be performed in conjunction with another proxy backup client among the plurality of proxy backup clients 120(1)-120(n), and may include any deduplication method or reason, including the deduplication methods and reasons described above.

In element 750, the data blocks are encrypted, although this operation is not mandatory. While this step may be performed at any point in this method (or not performed at all), the relevant operations are most optimally performed following any deduplication that is needed, pursuant to elements 730 and 740.

After any necessary processing (such as the processing described in connection with elements 710, 720, 730, 740 and 750) is completed, the data is then stored. The data can be stored, for example, in any appropriate non-volatile, non-transient computer-readable storage medium, such as a memory. Such a storage medium (or other storage device) may be part of the computer upon which the proxy backup client is hosted, may be attached to the computer through a hard-wired connection (e.g., a cable), or may be connected through a network such as the types of networks described elsewhere in this specification. Once the data has been stored, element 770 sends a message to the backup management server (e.g., backup management server 210) indicating information about the data, e.g., the location of the data in storage.

Figure 8:
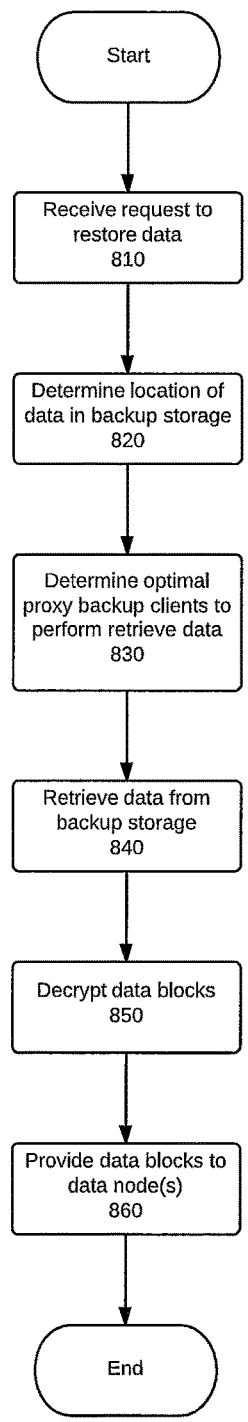
FIG. 8 is a flowchart for performing a restore operation pertaining to data distributed across a network, according to one embodiment of the present invention.

FIG. 8 is a flowchart of a method 800 illustrating various actions performed in connection with one embodiment the invention disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 800 is described with reference to elements such as those described in connection with FIGS. 1 and 2. In one implementation, at least a portion of method 800 can be implemented and/or performed by one or more proxy backup clients, such as one or more of the proxy backup clients 120(1)-120(n). However, a proxy backup client is not required to perform any of the steps of method 800.

Method 800 generally illustrates a restore process for distributed data that was previously backed up. Although the backup would have most preferably been made pursuant to the invention described herein, method 800 can also be employed with respect to a backup made by some other means. Further, a mixture of such approaches can be used, and such backup/restoration operations need not use the same number or configuration of proxy backup clients. As is the case with other methods or steps disclosed herein, one or more of proxy backup clients 120(1)-120(n) may complete one or more steps of method 800 at substantially the same time (e.g., in parallel) as/with another one or more of proxy backup clients 120(1)-120(n).

In one embodiment, the method begins at element 810, when a computer (e.g., one of the proxy backup clients 120(1)-120(n), the backup management system 210, or one of the backup servers 220(1)-220(n)) receives a request to restore data. Such a request could be of any form that identifies the data to be restored.

Upon receiving this request, a computer that receives the request can then determine the location of the data in the backup storage in element 820. Notably, one or more of the data blocks comprising the data may be stored on computers (e.g., backup storage server 221(1)-221(n) or backup storage 222(1)(1)-222(n)(m), or another computer with storage) distinct from the computers upon which the other data blocks are stored. Moreover, one or more of the data blocks may be stored on more than one computer.

Depending on various factors, such as the location(s) and dispersion of the data blocks, method 800 can determine which proxy backup clients should be used to perform the restore. A determination can be made, for example, by a backup management system (e.g., backup management system 210) or by a proxy backup client (where the proxy backup client assigns the backup to a different one of proxy backup clients 120(1)-120(n), for example). In element 830, a determination is made in order to assign the restore operations to one or more specific proxy backup client based on various factors, such as, for example, proximity to the storage location of the data to be restored, proximity to the computer requesting the data, as well as various criteria related to the proxy backup client, the computer containing the backup storage, and the network 140, such as the criteria, information, attributes and other factors listed elsewhere in this specification. Element 830 may also consider whether a majority of the data is located on a single computer, in which case the optimal proxy backup client may be the proxy backup client located the closest to that computer. Element 830 may also consider the volume of data to be restored, e.g., a larger volume of data to be restored may create a preference to use proxy backup clients that are fairly close geographically to the data or requesting computer, or that have a significant amount of available resources and bandwidth to perform the restore. Moreover, a large amount of data needing to be restored may also be considered when determining how many proxy backup clients 120(1)-120(n) to use for the restore operation.

One embodiment of this invention can combine these considerations, along with other relevant considerations, into an algorithm that determines how many proxy backup clients 120(1)-120(n) and/or which specific proxy backup clients 120(1)-120(n) should be assigned to perform any or all of the restore operations. Such an algorithm may be performed with any computer, such as, for example, backup management system 110 or one of the proxy backup clients 120(1)-120(n).

In element 840, the proxy backup client(s) begin the restore operation by requesting the needed data from backup storage, such as backup storage 222(1)(1)-222(n)(m). Although depicted herein as storage attached to a backup storage server 221(1)-221(n), the backup storage can be any non-volatile memory. Once the data has been received by the proxy backup client(s), the proxy backup client(s) can then decrypt the data if necessary (e.g., if the data had been stored in an encrypted form) in element 850. Finally, in element 860, the proxy backup client(s) can provide the data blocks to the requesting computer(s), e.g., one or more data nodes.

As shown above, the systems described herein can be implemented using a variety of computer systems and networks. Examples of such computing and network environments are described below with reference to FIGS. 9 and 10.

Figure 9:
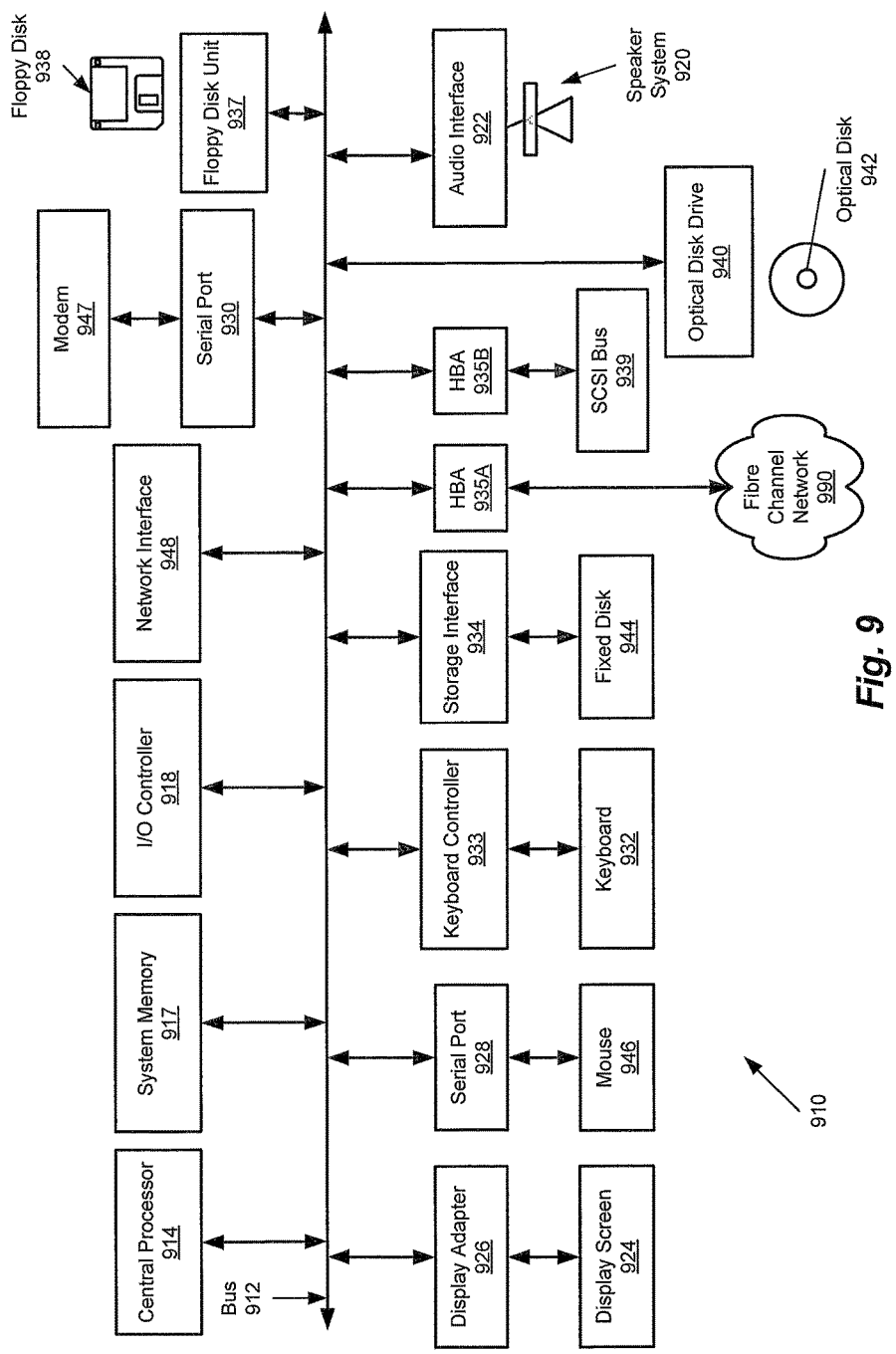
FIG. 9 is a block diagram of a computer system suitable for implementing aspects of the systems described herein, according to one embodiment.

FIG. 9 depicts a block diagram of a computer system 910 suitable for implementing aspects of the systems described herein. Computer system 910 includes a bus 912 which interconnects major subsystems of computer system 910, such as a central processor 914, a system memory 917 (typically RAM, but which may also include ROM, flash RAM, or the like), an input/output controller 918, an external audio device, such as a speaker system 920 via an audio output interface 922, an external device, such as a display screen 924 via display adapter 926, serial ports 928 and 930, a keyboard 932 (interfaced with a keyboard controller 933), a storage interface 934, a floppy disk drive 937 operative to receive a floppy disk 938, a host bus adapter (HBA) interface card 935A operative to connect with a Fibre Channel network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912).

Bus 912 allows data communication between central processor 914 and system memory 917, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 910 are generally stored on and accessed from a computer-readable storage medium, such as a hard disk drive (e.g., fixed disk 944), an optical drive (e.g., optical drive 940), a floppy disk unit 937, or other computer-readable storage medium.

Storage interface 934, as with the other storage interfaces of computer system 910, can connect to a standard computer-readable medium for storage and/or retrieval of information, such as a fixed disk drive 944. Fixed disk drive 944 may be a part of computer system 910 or may be separate and accessed through other interface systems. Modem 947 may provide a direct connection to a remote server via a telephone link or to the Internet via an internet service provider (ISP). Network interface 948 may provide a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 9 need not be present to practice the systems described herein. The devices and subsystems can be interconnected in different ways from that shown in FIG. 9. The operation of a computer system such as that shown in FIG. 9 is readily known in the art and is not discussed in detail in this application. Code to implement the modules of the systems described herein can be stored in computer-readable storage media such as one or more of system memory 917, fixed disk 944, optical disk 942, or floppy disk 938. The operating system provided on computer system 910 may be MS-DOS®, MS-WINDOWS®, UNIX®, Linux®, or other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 10:
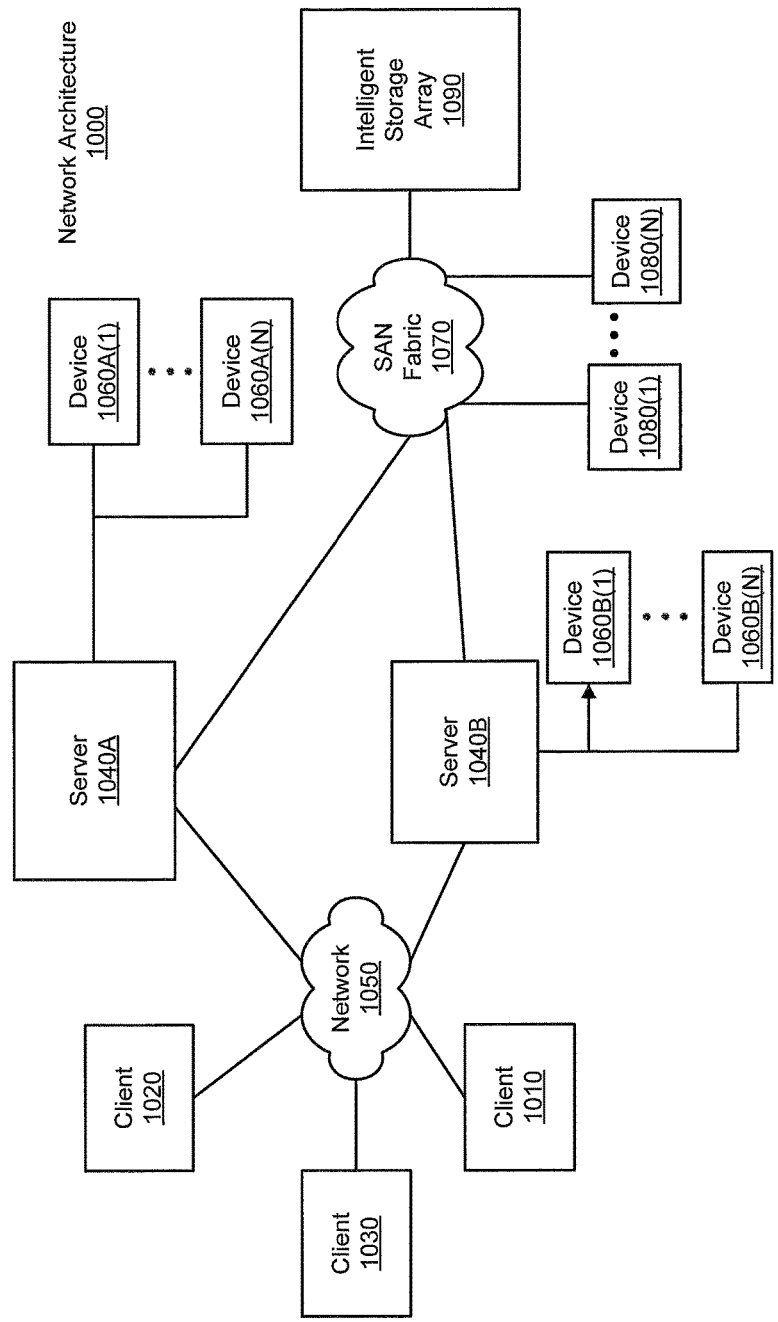
FIG. 10 is a block diagram of a networked system, illustration how various computing devices can communicate via a network, according to one embodiment.

FIG. 10 is a block diagram depicting a network architecture 1000 in which client systems 1010, 1020 and 1030, as well as storage servers 1040A and 1040B (any of which can be implemented using computer system 1010), are coupled to a network 1050. Storage server 1040A is further depicted as having storage devices 1060A(1)-(N) directly attached, and storage server 1040B is depicted with storage devices 1060B(1)-(N) directly attached. Storage servers 1040A and 1040B are also connected to a SAN fabric 1070, although connection to a storage area network is not required for operation. SAN fabric 1070 supports access to storage devices 1080(1)-(N) by storage servers 1040A and 1040B, and so by client systems 1010, 1020 and 1030 via network 1050. Intelligent storage array 1090 is also shown as an example of a specific storage device accessible via SAN fabric 1070.

With reference to computer system 910, modem 947, network interface 948 or some other method can be used to provide connectivity from each of client computer systems 1010, 1020 and 1030 to network 1050. Client systems 1010, 1020 and 1030 are able to access information on storage server 1040A or 1040B using, for example, a web browser or other client software (not shown). Such a client allows client systems 1010, 1020 and 1030 to access data hosted by storage server 1040A or 1040B or one of storage devices 1060A(1)-(N), 1060B(1)-(N), 1080(1)-(N) or intelligent storage array 1090. FIG. 10 depicts the use of a network such as the Internet for exchanging data, but the systems described herein are not limited to the Internet or any particular network-based environment.

The systems described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

The foregoing describes embodiments including components contained within other components (e.g., the various elements shown as components of computer system 910). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the systems described herein have been described in connection with several embodiments, these embodiments and their descriptions are not intended to be limited to the specific forms set forth herein. On the contrary, it is intended that such embodiments address such alternatives, modifications, and equivalents as can be reasonably included within the scope of the appended claims.

What is claimed is:

1. A computer-implemented method of backing up data, the method comprising:
   identifying data stored in a plurality of computer systems, wherein
      the plurality of computer systems comprises a plurality of data nodes,
      the data is stored at one or more data nodes of the plurality of data nodes, and
      the identifying identifies at least one of the one or more data nodes;
   requesting the data, wherein
      the requesting is performed by a proxy backup client of a plurality of proxy backup clients; and
   performing a backup operation on the data, wherein
      the backup operation is performed by at least two proxy backup clients of the plurality of proxy backup clients,
      the backup operation is distributed among the at least two proxy backup clients based on two or more criteria among a plurality of criteria, wherein the criteria comprises at least two of
         available bandwidth,
         available processing power, or
         proximity to one or more of the data nodes, and
      the performing comprises
         receiving at least a portion of the data at each of the at least two proxy backup clients, and
         storing the portion of the data in a memory in each of the at least two proxy backup clients.

2. The method of claim 1, wherein the identifying further comprises:
   requesting information about a location of the data, wherein
      the information identifies at least one of the data nodes.

3. The method of claim 2, wherein
   the requesting the information further comprises
      the data is stored at a plurality of the data nodes in a cluster,
      a first data node among the plurality of data nodes comprises a first operating system,
      a second data node among the plurality of data nodes comprises a second operating system, and
      the information identifies the first data node and the second data node; and
   the requesting the data further comprises
      requesting data substantially simultaneously from the first data node and the second data node.

4. The method of claim 1, further comprising:
   invoking the plurality of proxy backup clients, wherein
      the plurality of proxy backup clients are associated with a cluster, and
      the cluster comprises a storage management system and the one or more data nodes.

5. The method of claim 4, wherein the invoking further comprises:
   determining a number of proxy backup clients to invoke, wherein
      the data comprises a plurality of data blocks; and
      the determining is based on at least one of
         a volume of the data, and
         a number of data nodes upon which at least one of the data blocks is stored.

6. The method of claim 1, wherein the requesting the data further comprises:
   the data comprises a plurality of data blocks, and
   at least two of the plurality of proxy backup clients each request at least one of the data blocks at substantially the same time.

7. The method of claim 1, wherein the performing the backup operation further comprises:
   the data comprises a plurality of data blocks, and
   the data blocks are de-duplicated prior to storing the data in the memory.

8. A system comprising
   one or more processors;
   a memory coupled to the one or more processors, wherein
      the memory stores program instructions executable by the one or more processors to:
      identify data stored in a plurality of computer systems, wherein
         the plurality of computer systems comprises a plurality of data nodes,
         the data is stored at one or more data nodes of the plurality of data nodes, and
         at least one of the one or more data nodes are identified;
      request the data, wherein
         the request is performed by a proxy backup client of a plurality of proxy backup clients; and
      perform a backup operation on the data, wherein
         the backup operation is performed by at least two proxy backup clients of the plurality of proxy backup clients,
         the backup operation is distributed among the at least two proxy backup clients based on two or more criteria among a plurality of criteria, wherein the criteria comprises at least two of
            available bandwidth,
            available processing power, or
            proximity to one or more of the data nodes, and
         the backup operation performed comprises
            receiving at least a portion of the data at each of the at least two proxy backup clients, and
            storing the portion of the data in a memory in each of the at least two proxy backup clients.

9. The system of claim 8, wherein identifying the data comprises:
   request information about a location of the data, wherein
      the information identifies at least one of the data nodes.

10. The system of claim 8, further comprising:
    invoke the plurality of proxy backup clients, wherein
       the plurality of proxy backup clients are associated with a cluster, and
       the cluster comprises a storage management system and the one or more data nodes.

11. The system of claim 10, wherein invoking the plurality of proxy backup clients comprises:
   determine a number of proxy backup clients to invoke, wherein
      the data comprises a plurality of data blocks; and
      the number of proxy backup clients to invoke is determined based on at least one of
         a volume of the data, and
         a number of data nodes upon which at least one of the data blocks is stored.

12. The system of claim 8, wherein the request further comprises:
   the data comprises a plurality of data blocks, and
   at least two of the plurality of proxy backup clients each request at least one of the data blocks at substantially the same time.

13. The system of claim 9, wherein
   the request of the information further comprises
      the data is stored at a plurality of the data nodes in a cluster,
      a first data node among the plurality of data nodes comprises a first operating system,
      a second data node among the plurality of data nodes comprises a second operating system, and
      the information identifies the first data node and the second data node; and
   the request of the data further comprises
      request data substantially simultaneously from a first data node and a second data node.

14. A non-transitory computer-readable storage medium storing programming instructions executable to
   identify data stored in a plurality of computer systems, wherein
      the plurality of computer systems comprises a plurality of data nodes,
      the data is stored at one or more data nodes of the plurality of data nodes, and
      at least one of the one or more data nodes are identified;
   request the data, wherein
      the request is performed by a proxy backup client of a plurality of proxy backup clients; and
   perform a backup operation on the data, wherein
      the backup operation is performed by at least two proxy backup clients of the plurality of proxy backup clients,
      the backup operation is distributed among the at least two proxy backup clients based on two or more criteria among a plurality of criteria, wherein the criteria comprises at least two of
         available bandwidth,
         available processing power, or
         proximity to one or more of the data nodes, and
      the backup operation performed comprises
         receiving at least a portion of the data at each of the at least two proxy backup clients, and
         storing the portion of the data in a memory in each of the at least two proxy backup clients.

15. The non-transitory computer-readable storage medium of claim 14, wherein the programming instructions are further configured to:
   request information about a location of the data, wherein the information identifies at least one of the data nodes.

16. The non-transitory computer-readable storage medium of claim 14, wherein the programming instructions are further configured to:
   invoke the plurality of proxy backup clients, wherein
      the plurality of proxy backup clients are associated with a cluster, and
      the cluster comprises a storage management system and the one or more data nodes.

17. The non-transitory computer-readable storage medium of claim 16, wherein the programming instructions are further configured to:
   determine a number of proxy backup clients to invoke, wherein
      the data comprises a plurality of data blocks; and
      the number of proxy backup clients to invoke is determined based on at least one of
         a volume of the data, and
         a number of data nodes upon which at least one of the data blocks is stored.

* * * * *